United States Patent [19]
Ohki

[11] Patent Number: 5,189,635
[45] Date of Patent: Feb. 23, 1993

[54] DIGITAL DATA PROCESSING CIRCUIT

[75] Inventor: Mitsuharu Ohki, Tokyo, Japan

[73] Assignee: Sony Corporation, Tokyo, Japan

[21] Appl. No.: 828,386

[22] Filed: Jan. 30, 1992

[30] Foreign Application Priority Data

Jan. 31, 1991 [JP] Japan .................................. 3-011309

[51] Int. Cl.$^5$ ................................................. G06F 7/50
[52] U.S. Cl. ..................................... 364/784; 364/786
[58] Field of Search ............ 364/786, 784, 768, 715.01

[56] References Cited

U.S. PATENT DOCUMENTS

| 4,241,413 | 12/1980 | Hunt ..................... 364/784 |
| 4,766,565 | 8/1988 | Béchade et al. ..................... 364/784 |
| 4,839,848 | 1/1989 | Peterson et al. ..................... 364/757 |
| 5,084,834 | 1/1992 | Hartley et al. ..................... 364/786 |

FOREIGN PATENT DOCUMENTS 59-51022 12/1984 Japan .

Primary Examiner—Tan V. Mai
Attorney, Agent, or Firm—Hill, Steadman & Simpson

[57] ABSTRACT

A digital data processing circuit includes an adder circuit supplied with input data in a time-division multiplexed manner over a plurality of signal lines. The adder circuit is capable of executing additions at an optimum processing speed depending on the rate of the input data, and has a reduced circuit scale. The digital data processing circuit includes a 2-input data selector, a first register, a first full adder for supplying a carry output through the first register to one input terminal of the 2-input data selector, a second register, and a second full adder for supplying a carry output through the second register to the other input terminal of the 2-input data selector. The first and second full adders have input terminals for receiving first and second data supplied in a time-division multiplexed manner. The 2-input data selector is controlled to select the supplied carry outputs for producing the sum of the first and second data as sum outputs from the first and second full adders.

1 Claim, 14 Drawing Sheets

1st Cycle | 2nd Cycle — — — 6th Cycle

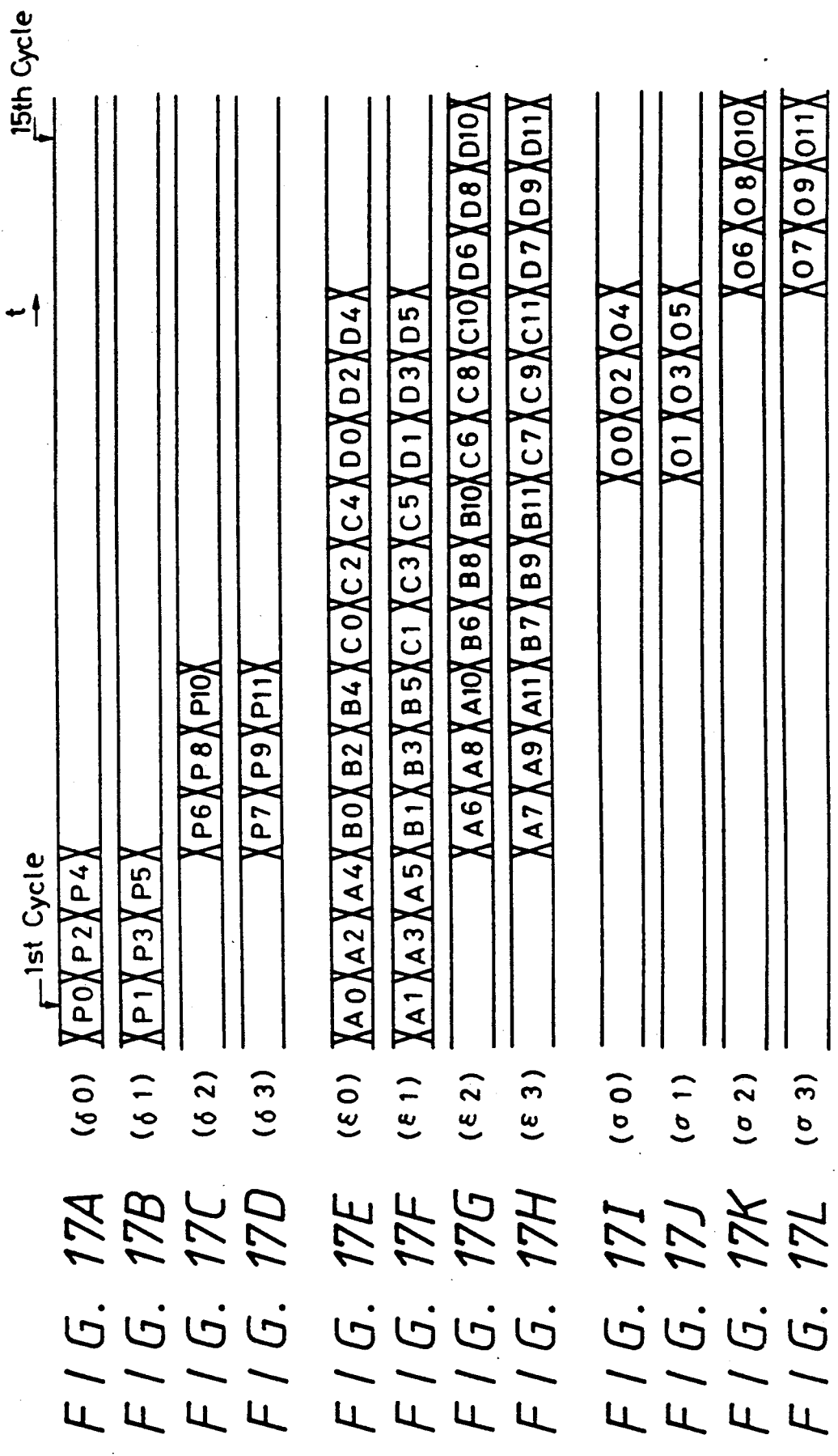

DIGITAL DATA PROCESSING CIRCUIT

BACKGROUND OF THE INVENTION

1. Field of the Invention

The present invention relates to a digital data processing circuit in the form of a pipelined adder circuit.

2. Description of the Prior Art

FIG. 1 of the accompanying drawings shows a conventional carry ripple adder circuit comprising a plurality of full adders 1A~1I. A carry from the full adder 1A at a lowest bit position or LSB is passed successively through the full adders 1B, . . ., 1I. Each of the full adders 1A~1I has input terminals supplied with 1-bit data out of first data (A8, A7, . . ., A0) having a word length of 9 bits and 1-bit data out of second data (B8, B7, . . ., B0) having a word length of 9 bits. The full adders 1A~1I have respective output terminals for outputting 9-bit data (08, 07, . . ., 00) which are the sum of the first and second data. The data items A8, B8, 08 are MSBs, respectively. One carry propagating circuit for adder circuits is disclosed in Japanese Patent Publication No. 59-51022, for example.

The carry ripple adder shown in FIG. 1 operates at low speed as it requires a long processing time in which the carry is passed from the LSB to the MSB. A generalization of the carry ripple adder shown in FIG. 1 shows that an adder circuit for adding data having a word length of n bits (n is an integer of 1 or more) requires a processing time (delay time) corresponding to the processing times of n full adders for one adding operation.

FIG. 2 of the accompanying drawings an adder circuit which employs pipeline processing for the propagation of a carry for high-speed operation. Specifically, registers 2A~2H for holding data are connected between the carry output terminals of preceding full adders and the carry input terminals of following full adders. The pipelined arrangement is effective to delay input data more times for higher bits into timed relationship to the propagation of the carry. The adder circuit operates at high speed since it can add the data in a processing time that is equal to the processing time of one full adder.

If the input data are supplied to the adder circuit shown in FIG. 2 at a data rate that is equivalent to the processing time of three full adders, then the processing speed of the adder circuit becomes threefold, resulting in excessive specifications. As a result, the processing capability of the adder circuit cannot be fully put to use, and is wasteful.

To equalize the input data rate to the processing time of three full adders, the data may be transmitted as shown in FIGS. 3A through 3C of the accompanying drawings. In the system shown in FIG. 3A, data rows A, B, C, . . . each having a word length of 3 bits are successively transmitted over a single signal line. More specifically, if it is assumed that the 3-bit data rows A, B, C, . . . are indicated by A=(A2, A1, A0), B=(B2, B1, B0), C=(C2, C1, C0), . . ., respectively, then the data are successively transmitted in the sequence of A0, A1, A2, B0, B1, B2, C0, . . . one bit in a cycle over the signal line.

In the system shown in FIG. 3B, data rows A, B, C, . . . each having a word length of 6 bits are transmitted as data of high-order 3 bits and low-order 3 bits over two signal lines. More specifically, if it is assumed that the 6-bit data rows A, B, C, . . . are indicated by A=(A5, A4, A3, A2, A1, A0), B=(B5, B4, B3, B2, B1, B0), C=(C5, C4, C3, C2, C1, C0), . . ., respectively, then the data are successively transmitted in the sequence of A0, A1, A2, B0, B1, B2, C0, . . . one bit in a cycle over the first signal line, and in the sequence of A3, A4, A5, B3, B4, B5, C3, . . . one bit in a cycle over the second signal line with a delay of 3 cycles with respect to the first signal line.

In the system shown in FIG. 3C, data rows A, B, C, . . . each having a word length of 9 bits are transmitted as data of high-order 3 bits, middle-order 3 bits, and low-order 3 bits over three signal lines. More specifically, if it is assumed that the 9-bit data A are indicated by A=(A8, . . ., A1, A0), then the low-order bits (A0, A1, A2) are transmitted over the first signal line, the middle-order bits (A3, A4, A5) are transmitted over the second signal line with a delay of 3 cycles, and the high-order bits (A6, A7, A8) are transmitted over the third signal line with a further delay of 3 cycles. If it is assumed that the 9-bit data B are indicated by B=(B8, . . ., B1, B0), then the bits (Bj, Bj+1, Bj+2) of the data B are transmitted, following the bits (Aj, Aj+1, Aj+2) of the data A, over the signal lines. The bits of the data C are thereafter transmitted following the data B.

According to a generalization of the data transmission systems shown in FIGS. 3A, 3B, and 3C, data rows A, B, C, . . . each having a word length of n (n is a multiple of 3) can be transmitted in a time-division multiplexed fashion over n/3 signal lines. The data structure of the data rows is expressed by the following equations (1):

$$A=(An-1, An-2, \ldots, A1, A0),$$

$$B=(Bn-1, Bn-2, \ldots, B1, B0),$$

$$C=(Cn-1, Cn-2, \ldots, C1, C0) \quad (1)$$

where An−1, Bn−1, Cn−1 are MSBs and A0, B0, C0 are LSBs.

The data rows according to the equations (1) can also be transmitted in a time-division multiplexed manner over 2 ×n/6 signal lines, as shown in FIGS. 4A, 4B, and 4C. FIG. 4A shows a data transmission system in which data rows A, B, C, . . . each having a word length of 6 bits are transmitted over two signal lines. FIG. 4B shows a data transmission system in which data rows A, B, C, . . . each having a word length of 12 bits are transmitted over four signal lines. FIG. 4C shows a data transmission system in which data rows A, B, C, . . . each having a word length of 18 bits are transmitted over six signal lines. Furthermore, data rows A, B, C, . . . each having a word length of n (n is a multiple of 4) can be transmitted in a time-division multiplexed fashion over n/4 signal lines.

OBJECTS AND SUMMARY OF THE INVENTION

It is an object of the present invention to provide a digital data processing circuit of a relatively small circuit scale for adding input data at an optimum processing speed depending on the data rate in a system which is supplied with the input data in a time-division multiplexed fashion over a plurality of signal lines.

According to the present invention, there is provided a digital data processing circuit comprising a 2-input data selector having two input terminals and an output terminal, a first register connected to one of the two input terminals of the 2-input data selector, a first full adder having a carry output terminal connected to the first register, for supplying a carry output through the first register to said one input terminal of said 2-input data selector, the output terminal of the 2-input data selector being connected to an input terminal of the first full adder, a second register connected to the other of the two input terminals of the 2-input data selector, and a second full adder having a carry output terminal connected to the second register, for supplying a carry output through the second register to the other input terminal of the 2-input data selector, the first and second full adders having input terminals for receiving first and second data supplied in a time-division multiplexed manner, wherein the 2-input data selector is controlled to select the supplied carry outputs for producing the sum of the first and second data as sum outputs from the first and second full adders.

When the data selector selects the carry output from the first full adder, the first full adder adds the input data as a usual serial data adder. When the data selector selects the carry output from the second full adder, the first full adder adds a carry output from a lower bit position, thus pipelining the propagation of the carry in a time-division multiplexing process. The full adders operate in the time-division multiplexing process to make the entire adder circuit relatively small in circuit scale.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIGS. 4A, 4B, and 4C are timing charts showing other data transmission systems for transmitting data in a time-division multiplexed manner;

FIGS. 12A through 12I are timing charts showing an operation sequence of the accumulator shown in FIG. 11;

Figures 14A, 14B, 14C, 14D, 14E, 14F, 14G, 14H, 14I, 14J, 14K, 14L:
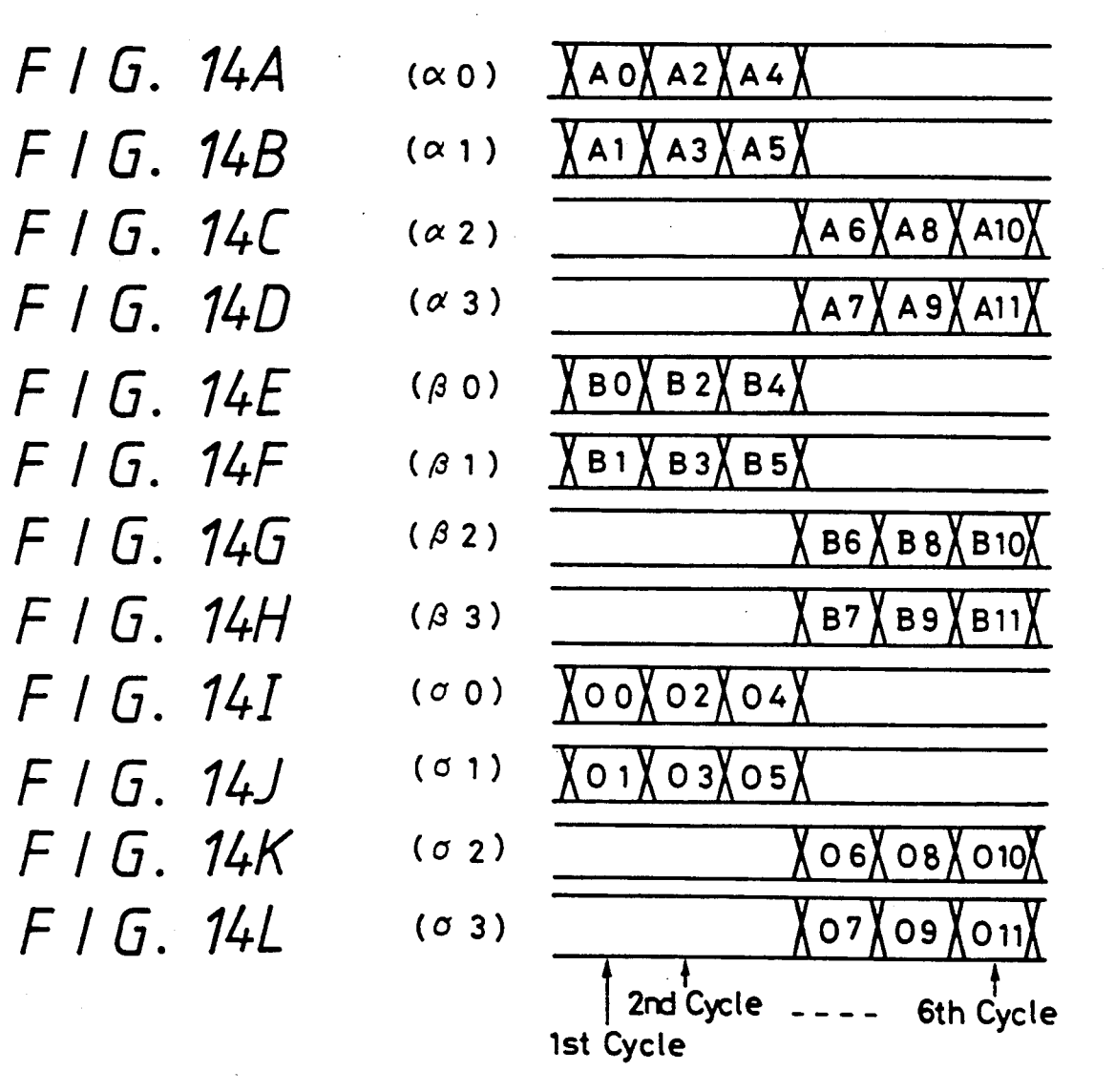

FIGS. 14A through 14L are timing charts showing an operation sequence of the adder circuit shown in FIG. 13;

FIGS. 17A through 17L are timing charts showing an operation sequence of the accumulator shown in FIG. 16.

DETAILED DESCRIPTION OF THE PREFERRED EMBODIMENTS

A digital data processing circuit as an adder circuit according to a first embodiment of the present invention will be described below with reference to FIGS. 5 through 8A–8I.

Figure 5:
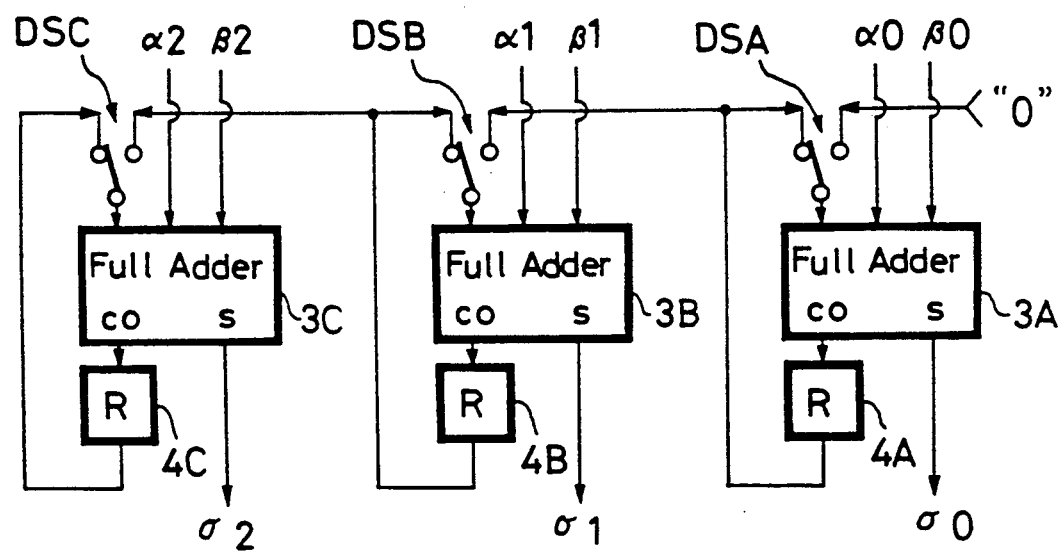
FIG. 5 is a block diagram of an adder circuit according to a first embodiment of the present invention.

FIG. 5 shows an adder circuit comprising full adders $3A \sim 3C$, registers $4A \sim 4C$ as unit delay elements, and data selectors $DSA \sim DSC$. Signal lines $\alpha 0, \beta 0$ are connected to two input terminals of the full adder 3A at a lowest bit position or an LSB, and the data selector DSA has an output terminal connected to the remaining input terminal (e.g., carry input terminal) of the full adder 3A. The data selector DSA has an input terminal supplied with data of a low level "0". A carry output from the full adder 3A is supplied to the other input terminal of the data selector DSA through the register 4A. The carry output from the register 4A is supplied to one input terminal of the data selector DSB at an intermediate bit position.

Signal lines $\alpha 1, \beta 1$ are connected to two input terminals of the full adder 3B at the intermediate bit position, and the data selector DSB has an output terminal connected to the remaining input terminal (e.g., carry input terminal) of the full adder 3B. A carry output from the full adder 3B is supplied to the other input terminal of the data selector DSB through the register 4B. The carry output from the register 4B is supplied to one input terminal of the data selector DSC at a highest bit position or an MSB. Likewise, signal lines $\alpha 2, \beta 2$ are connected to two input terminals of the full adder 3C at the MSB. A carry output from the full adder 3C is supplied to the other input terminal of the data selector DSC through the register 4C. The data selector DSC supplies its output to the remaining input terminal of the full adder 3C. Signal lines $\sigma 0 \sim \sigma 2$ for outputting data are connected respectively to sum output terminals of the full adders $3A \sim 3C$.

It is assumed that two 9-bit input data A, B have data structures as follows:

$$A = (A8, A7, \ldots, A0),$$

$$B = (B8, B7, \ldots, B0), \text{ and}$$

that 9-bit data O as the sum of the data A, B has a data structure as follows:

$$O = A + B = (O8, O7, \ldots, O0) \tag{2}$$

with the carry to the 10th bit being ignored. To the adder circuit shown in FIG. 5, there are inputted the 9-bit data A in 9 cycles in a time-division multiplexed manner over the signal lines $\alpha 0 \sim \beta 2$ as shown in FIGS.

Figures 6A, 6B, 6C, 6D, 6E, 6F, 6G, 6H, 6I:
FIGS. 6A through 6I are timing charts showing an operation sequence of the adder circuit shown in FIG. 5.

6A through 6C and the 9-bit data B in 9 cycles in a time-division multiplexed manner over the signal lines $\beta 0 \sim \beta 2$ as shown in FIGS. 6D through 6F. The adder circuit thus outputs 9-bit sum data in 9 cycles in a time-division multiplexed manner over the signal lines $\sigma 0 - \sigma 2$ as shown in FIGS. 6G through 6I.

Figure 7:
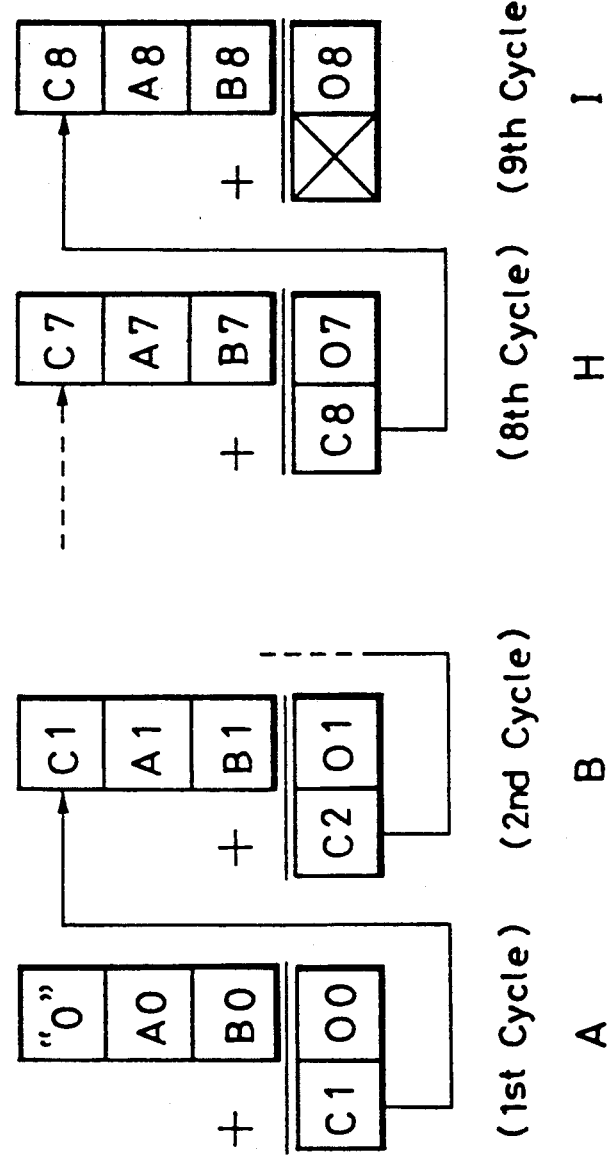
FIG. 7 is a diagram illustrative of an adding operation of the adder circuit shown in FIG. 5.

The operation of the adder circuit shown in FIG. 5 for the addition according to the equation (2) above will be described below with reference to FIG. 7. In a first cycle (see A in FIG. 7), the data A0, B0, which are the LSBs of the input data, are added to each other calculating data O0, which is the LSB of the output data, and also a carry output C1 to the second bit. In a second cycle (see B in FIG. 7), the data A1, B1, which are the second bits of the input data, and the carry output C1 are added to each other calculating data O1, which is the second bit of the output data, and also a carry output C2 to the third bit. Similarly, output data O2~O8 are calculated.

In the first cycle, an external control signal is applied to the data selector DSA to select the data of "0". Since the data A0, B0 are inputted from the signal lines $\alpha 0$, $\beta 0$, the full adder 3A carries out the calculation as shown in FIG. 7 at A. The fuller adder 3A outputs the data O0 to the signal line $\sigma 0$, and the carry output C1 to the second bit is held by the register 4A.

In the second cycle, an external control signal is applied to the data selector DSA to select the output data from the register 4A. Therefore, the full adder 3A is supplied with the carry output C1 from the previous cycle. Since the data A1, B1 are inputted from the signal lines $\alpha 0$, $\beta 0$, the full adder 3A carries out the calculation as shown in FIG. 7 at B. The carry output C2 to the third bit is held by the register 4A. In the third cycle, similarly, the output from the register 4A is selected by the data selector DSA to carry out the calculation for the third bit. The carry output C3 to the fourth bit is held by the register 4A.

In the fourth cycle, an external control signal is applied to the data selector DSB at the intermediate bit position to select the output data from the register 4A at the lower bit position. The carry output C3 to the fourth bit is now inputted to the full adder 3B at the intermediate bit position. Since the data A3, B3 are supplied to the full adder 3B through the signal lines $\alpha 1$, $\beta 1$, the full adder 3B carries out the calculation C3+A3+B3=(C4, O4). The fuller adder 3B outputs data O4 to the signal line $\sigma 1$, and the carry output C4 to the fifth bit is held by the register 4B. In the fifth and sixth cycles, the data selector DSB is controlled to select the output data from the register 4B.

In the seventh cycle, an external control signal is applied to the data selector DSC at the highest bit position or the MSB to select the output data from the register 4B at the lower bit position. The carry output C6 to the seventh bit is now inputted to the full adder 3C at the MSB. Since the data A6, B6 are simultaneously supplied to the full adder 3C through the signal lines $\alpha 2$, $\beta 2$, the full adder 3C outputs data O6 to the signal line $\sigma 2$, and the carry output C7 to the eighth bit is held by the register 4C. In the eighth and ninth cycles, the data selector DSC is controlled to select the output data from the register 4C. In the eighth cycle, the full adder 3C is supplied with data A7, B7 through the signal lines $\alpha 2$, $\beta 2$, and carries out the calculation as shown in FIG. 7 at H. The full adder 3C now produces output data O7 and a carry output C8 to the ninth bit. In the ninth cycle, the full adder 3C is supplied with data A8, B8 through the signal lines $\alpha 2$, $\beta 2$, and carries out the calculation as shown in FIG. 7 at I. The full adder 3C now outputs data O8 to the signal line $\sigma 2$.

The operation sequence shown in FIGS. 6A through 6I is characterized in that the full adders 3A, 3B, 3C are used only in the first through third cycles, the fourth through sixth cycles, and seventh through ninth cycles, respectively. The additions of a series of pairs of successively supplied data can be calculated in the idle times of the full adders 3A through 3C.

It is assumed that ones of the series of data pairs are represented by:

$$A = (A8, A7, \ldots, A0),$$

$$D = (D8, D7, \ldots, D0),$$

$$F = (F8, F7, \ldots, F0),$$

. . . . . .

and the others of the series of the data pairs are represented by:

$$B = (B8, B7, \ldots, B0),$$

$$E = (E8, E7, \ldots, E0),$$

$$G = (G8, G7, \ldots, G0),$$

. . . . . .

Also, it is assumed that the results of the additions of the data pairs are represented by:

$$O = A + B = (O8, O7, \ldots, O0),$$

$$P = D + E = (P8, P7, \ldots, P0),$$

$$Q = F + G = (Q8, Q7, \ldots, Q0),$$

. . . . . .

Figures 8A, 8B, 8C, 8D, 8E, 8F, 8G, 8H, 8I:
FIGS. 8A through 8I are timing charts showing an operation sequence of the adder circuit shown in FIG. 5, to which data are successively inputted.

The data A, D, F, . . . of the data pairs are supplied in a time-division multiplexed manner to the adder circuit over the signal lines $\alpha 0 \sim \beta 2$, as shown in FIGS. 8A through 8C, and the other data B, E, G, . . . of the data pairs are supplied in a time-division multiplexed manner to the adder circuit over the signal lines $\beta 0 \sim \beta 2$, as shown in FIGS. 8E through 8F. Then, the adder circuit outputs the results of the additions, i.e., the sums, O, P, Q, . . . to the signal lines $\sigma 0 \sim \sigma 2$, as shown in FIGS. 8G through 8I.

Figure 9:
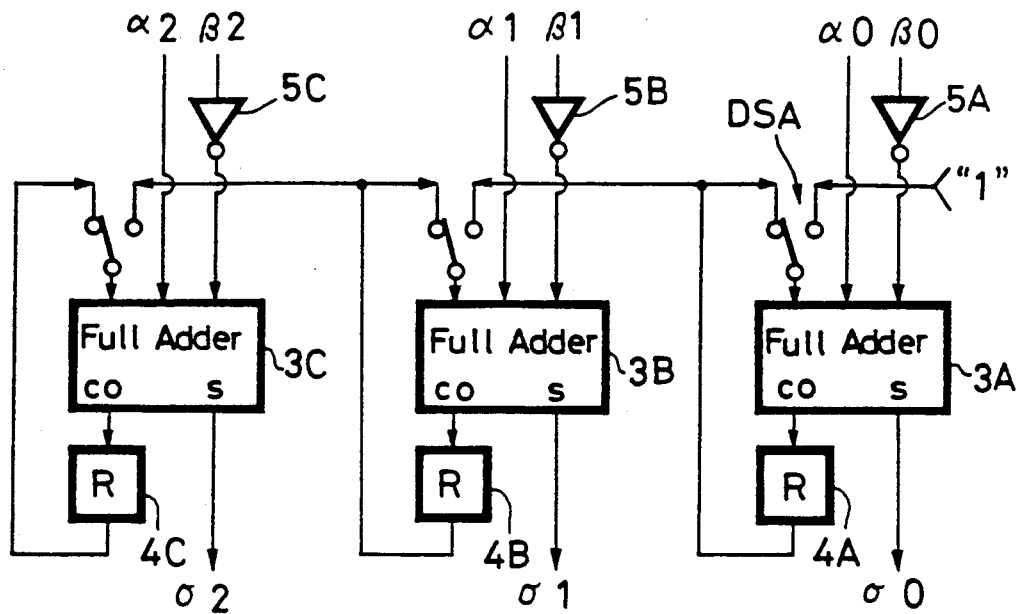
FIG. 9 is a block diagram of a subtractor which basically incorporates the adder circuit shown in FIG. 5.

FIG. 9 shows a subtractor which basically incorporates the adder circuit shown in FIG. 5. The subtractor shown in FIG. 9 is of substantially the same arrangement as the adder circuit shown in FIG. 5 except that inverters 5A ~5C are connected between the signal lines $\beta 0 \sim \beta 2$ and the full adders 3A~3C, and data of "1" is supplied to one input terminal of the data selector DSA at the LSB. If the two input data A, B are supplied as two's complements, then the adder circuit calculates (A+inverted B), rather than (A+B), and adds "1" to the LSB. This is equivalent to the subtraction (A~B) according to the two's complement representation.

Figure 10:
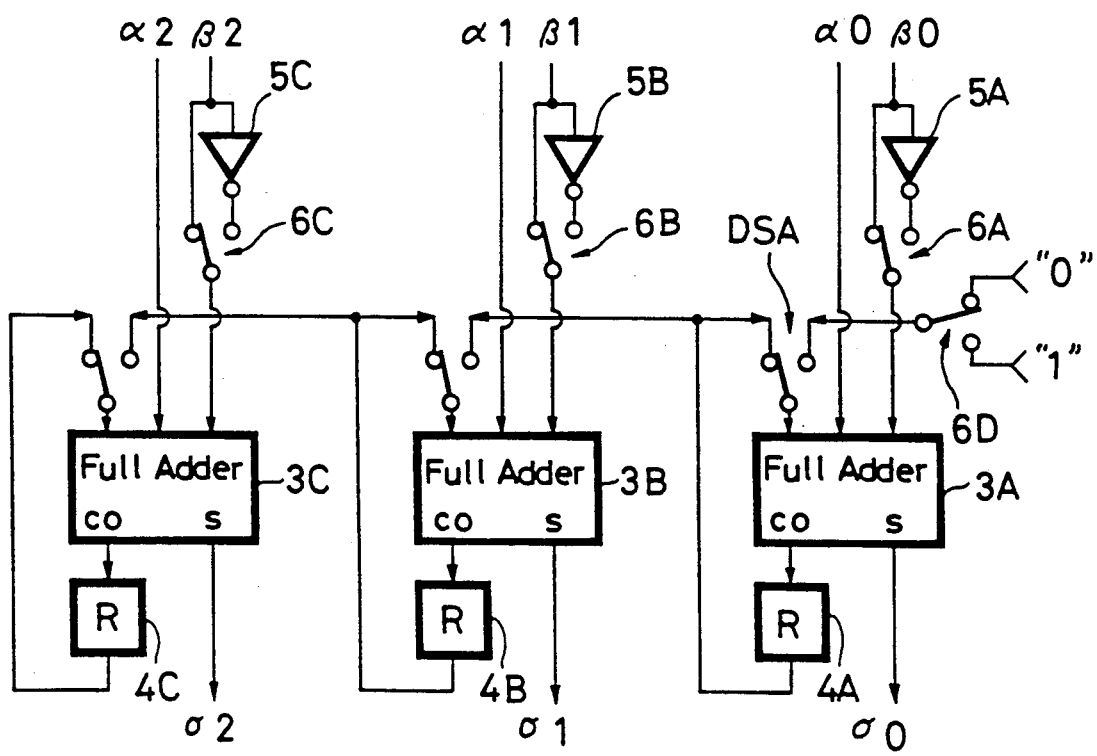
FIG. 10 is a block diagram of an adder/subtractor which basically incorporates the adder circuit shown in FIG. 5.

As shown in FIG. 10, an adder/subtractor is constructed by connecting additional data selectors 6A~6C between the signal lines $\beta 0 \sim \beta 2$ and the full adders 3A~3C, and data of "1" or "0" is supplied to one input terminal of the data selector DSA at the LSB through another data selector 6D. The circuit shown in FIG. 10 operates as an adder or a subtractor when the data selectors 6A~5D are shifted.

An accumulator which basically incorporates the adder circuit shown in FIG. 5 will be described below with reference to FIGS. 11 and 12.

Figure 11:
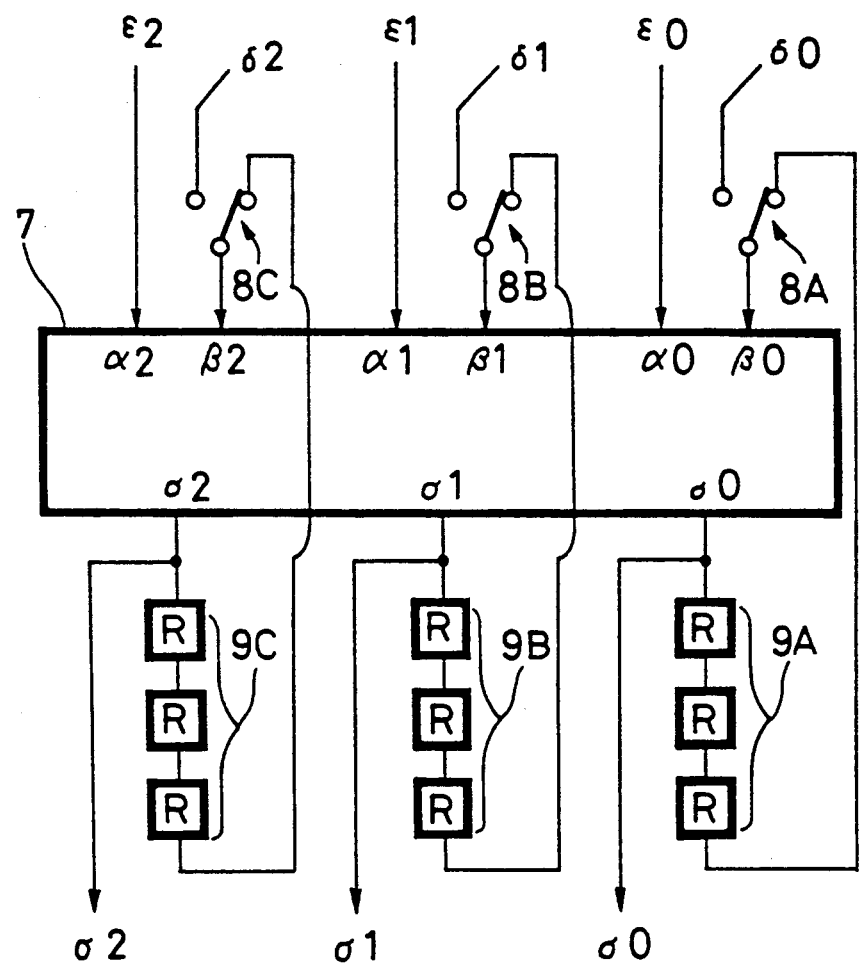
FIG. 11 is a block diagram of an accumulator which basically incorporates the adder circuit shown in FIG. 5.

FIG. 11 shows an accumulator including an adder circuit 7 which is identical to the adder circuit shown in FIG. 5. In FIG. 11, the signal lines $\alpha 0$, $\beta 0$, $\alpha 1$, $\beta 1$, $\alpha 2$, $\beta 2$ are referred to as input terminals $\alpha 0$, $\beta 0$, $\alpha 1$, $\beta 1$, $\alpha 2$, $\beta 2$, and the signal lines $\sigma 0$, $\sigma 1$, $\sigma 2$ as output terminals $\sigma 0$, $\sigma 1$, $\sigma 2$. The accumulator includes delay circuits 9A~9C each composed of three cascaded unit delay elements. Signal lines $\epsilon 0 \sim \epsilon 2$ are connected respectively to the input terminals $\alpha 0 \sim \alpha 2$ of the adder circuit 7, and signal lines $\delta 0 \sim \delta 2$ are connected respectively to input terminals of the data selectors 8A~8C. The data selectors 8A~8C have respective output terminals connected to the input terminals $\beta 0 \sim \beta 2$ of the adder circuit 7. The output terminals $\sigma 0 \sim \sigma 2$ of the adder circuit 7 are connected through the respective delay circuits 9A~9C to the other input terminals of the data selectors 8A~8C, respectively. The output terminals $\sigma 0 \sim \sigma 2$ of the adder circuit 7 serve directly as the output terminals of the accumulator.

Data P (whose element is Pi) each having a word length of 9 bits are supplied in 9 cycles in a time-division multiplexed manner to the input terminals $\beta 0 \sim \beta 2$ of the adder circuit 7 over the signal lines $\delta 0 \sim \delta 2$, as shown in FIGS. 12A through 12C. Data A, B, C, D each having a word length of 9 bits are supplied in 18 cycles in a time-division multiplexed manner to the input terminals $\alpha 0 \sim \alpha 2$ of the adder circuit 7 over the signal lines $\epsilon 0 \sim \epsilon 2$, as shown in FIGS. 12D through 12F. The final result O of the addition, or the sum, achieved by the adder circuit 7 is expressed as follows:

$$O = P + A + B + C + D = (O8, O7, \ldots, O1, O0) \quad (3).$$

The 9-bit data 0 is outputted in 9 cycles in a time-division multiplexed manner from the output terminals $\sigma 0 \sim \sigma 2$ of the adder circuit 7, as shown in FIGS. 12G through 12I.

Interim sums X, Y, Z in the equation (3) are expressed as follows:

$$X = P + A = (X8, X7, \ldots, X0),$$

$$Y = X + B = (Y8, Y7, \ldots, Y0),$$

$$Z = Y + C = (Z8, Z7, \ldots, Z0),$$

$$O = Z + D \quad (4).$$

These interim sums are shown in a time-division multiplexed manner in FIGS. 12A~12C and 12G~12I.

Operation of the accumulator shown in FIG. 11 will be described below with reference to FIGS. 12A through 12I. In first through third cycles, since data P0~P2 are inputted from the signal line $\delta 0$, an external control signal is applied to cause the data selector 8A to select the signal line $\delta 0$ to supply the data P0, P1, P2 to the input terminal $\beta 0$ of the adder circuit 7. In fourth through sixth cycles and seventh through ninth cycles, similarly, data P3~P5 and P6~P8 inputted from the respective signal lines $\delta 1$, $\delta 2$ are supplied through the respective data selectors 8B, 8C to the input terminals $\beta 1$, $\beta 2$ of the adder circuit 7. The input terminals $\alpha 0 \sim \alpha 2$ of the adder circuit 7 are supplied with the following data:

Input terminal $\alpha 0$: A0~A2 in first through third cycles,

Input terminal $\alpha 1$: A3~A5 in fourth through sixth cycles,

Input terminal $\alpha 2$: A6~A8 in seventh through ninth cycles.

The adder circuit 7, which is thus supplied with the data P, A, effects the calculation X=P+A, and outputs the following interim data from the output terminals $\sigma 0 \sim \sigma 2$ thereof:

Output terminal $\sigma 0$: X0~X2 in first through third cycles,

Output terminal $\sigma 1$: X3~X5 in fourth through sixth cycles,

Output terminal $\sigma 2$: X6~X8 in seventh through ninth cycles.

In fourth through sixth cycles, an external control signal is applied to cause the data selector 8A to select output data from the delay circuit 9A for thereby inputting the output data X0~X2 (FIG. 12G) from the output terminal $\sigma 0$, as delayed by 3 cycles, to the input terminal $\beta$ of the adder circuit 7 (FIG. 12A). In seventh through ninth cycles, the interim data X3~X5 are inputted to the input terminal $\beta 1$ of the adder circuit 7 (FIGS. 12H and 12B), and in tenth through twelfth cycles, the interim data X6~X8 are inputted to the input terminal $\beta 2$ of the adder circuit 7 (FIGS. 12I and 12C). At the same time, in the fourth through twelfth cycles, the input terminals $\alpha 2 \sim \alpha 2$ of the adder circuit 7 are supplied with the nine data B0~B8 of the data B to be added.

In the fourth through twelfth cycles, since the interim data X and the next data B to be added are supplied to the adder circuit 7, the adder circuit 7 carries out the calculation Y=X+B. The output terminals $\sigma 0$, $\sigma 1$, $\sigma 2$ of the adder circuit 7 output the data Y0~Y2 of the interim data Y (in the fourth through sixth cycles), the data Y3~Y5 of the interim data Y (in the seventh through ninth cycles), and the data Y6~Y8 of the interim data Y (in the tenth through twelfth cycles). These 3-bit data of the interim data Y are delayed 3 cycles by the respective delay circuits 9A, 9B, 9C, and fed back to the input terminals $\beta 0$, $\beta 1$, $\beta 2$. Concurrent with this, since the input terminals $\alpha 0 \sim \alpha 2$ of the adder circuit 7 are supplied with 3-bit data of the next data C to be added, the adder circuit 7 carries out the calculation Z=Y+C. Then, the output terminals $\sigma 0$, $\sigma 1$, $\sigma 2$ of the adder circuit 7 output the data Z0~Z2, Z3~Z5, and Z6~Z8, respectively, of the interim data Z. Thereafter, the adder circuit 7 calculates O=Z+D, and within 9 cycles from the tenth through eighteenth cycles, the output terminals $\sigma 0$, $\sigma 1$, $\sigma 2$ of the adder circuit 7 output the 3-bit data O0~O2, O3~O5, and O6~O8, respectively, of the sum O (i.e., the output data of the accumulator).

In the circuit arrangement shown in FIG. 11, the output data from the output terminals $\sigma 0$, $\sigma 1$, $\sigma 2$ of the adder circuit 7 are fed back to the input terminals $\beta 0$, $\beta 1$, $\beta 2$ through the respective delay circuits each composed of three unit delay elements. This is because the circuit arrangement processes the data in a threefold time-division multiplexing process. Generally, for an m-fold time-division multiplexing process, each of the delay circuits comprises m unit delay elements (registers).

A digital data processing circuit as an adder circuit according to a second embodiment of the present invention will be described below with reference to FIGS. 13 through 17A~17L.

Figures 4A, 4B, 4C:
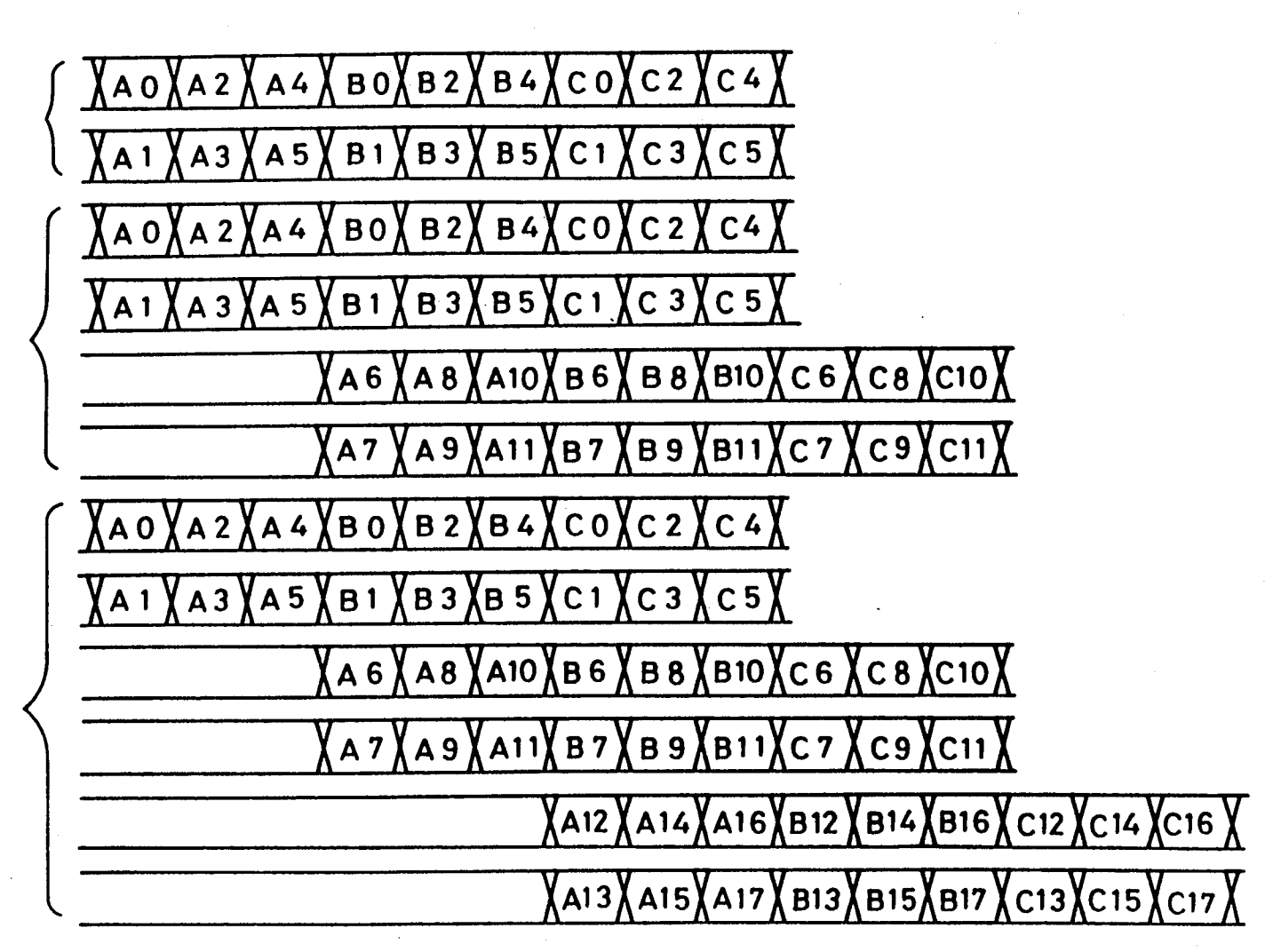

According to the second embodiment, the present invention is applied to an adder circuit wherein input data are transmitted in the data transmission system shown in FIGS. 4A through 4C. The adder circuit adds input data A, B each having a word length of 12 bits, and produces a sum 0 having a word length of 12 bits. If the input data A is represented by (A11, A10, ..., A0) and the input data B by (B11, B10, ..., B0), then the sum O is expressed as follows:

$$O = A + B = (O11, O10, \ldots, O1, O0) \quad (5).$$

As shown in FIG. 9, the adder circuit comprises a first -2-bit adder 10 composed of a full adder 11A and a full adder 11B, the full adder 11A having a carry output terminal connected to a carry input terminal of the full adder 11B. In the 2-bit adder 10, the full adder 11A has two-bit input terminals connected to respective signal lines $\alpha 0$, $\beta 0$, and the full adder 11B has two-bit input terminals connected to respective signal lines $\alpha 1$, $\beta 1$. The full adders 11A, 11B have respective sum output terminals connected to respective signal lines $\sigma 0$, $\sigma 1$ for outputting sum data. A first data selector 12 has one input terminal supplied with data of "0" and another input terminal connected to a carry output terminal of the full adder 11B through a register 13 as a unit delay element.

The adder circuit also comprises a second 2-bit adder 14 which is identical in structure to the first 2-bit adder 10. The second 2-bit adder 14 has low-order 2-bit input terminals connected to signal lines $\alpha 2$, $\beta 2$, respectively, high-order 2-bit input terminals connected to signal lines $\alpha 3$, $\beta 3$, respectively, and 2-bit output terminals connected to respective signal lines $\sigma 2$, $\sigma 3$ for outputting sum data. A second data selector 15 has an output terminal connected to a carry input terminal of the adder 14, an input terminal connected to the output terminal of the register 13, and another input terminal connected to a carry output terminal of the adder 14 through a register 16. The adder circuit is supplied with the bits of the data A in 6 cycles in a time-division multiplexed fashion over the signal lines $\alpha 0 \sim \alpha 3$, as shown in FIGS. 14A through 14D, and also with the bits of the data B in 6 cycles in a time-division multiplexed fashion over the signal lines $\beta 0 \sim \beta 3$, as shown in FIGS. 14E through 14H. The output terminals $\sigma 0 \sim \sigma 3$ of the adder circuit then output the bits of the sum O in 6 cycles in a time-division multiplexed fashion, as shown in FIGS. 14I through 14L.

Figure 15:
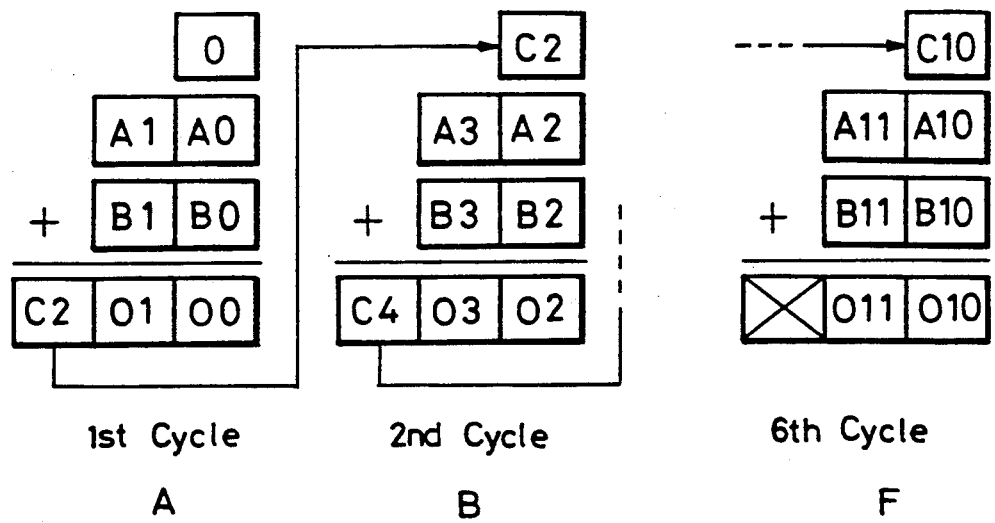
FIG. 15 is a diagram illustrative of an adding operation of the adder circuit shown in FIG. 13.

The operation of the adder circuit shown in FIG. 13 for the addition shown in FIGS. 14A through 14L will be described below with reference to FIG. 15. In a first cycle, the first 2-bit adder 10 is supplied with the low-order 2 bits A0, A1 of the data A and the low-order 2 bits B0, B1 of the data A, and carries out the calculation shown in FIG. 15 at A. A carry output C2 to the third bit is held by the register 13. In a second cycle, the adder 10 carries out the calculation shown in FIG. 15 at B. Likewise, the adder 10 also carries out an addition in a third cycle. In fourth and fifth cycles, the second 2-bit adder 14 carries out an addition. In a sixth cycle, the 2-bit adder 14 carries out the calculation shown in FIG. 15 at F.

In the case where an adder circuit for processing data having a word length of n bits is constructed using the circuit arrangement shown in FIG. 5, it requires n/3 full adders, n/3 registers, and n/3 2-input data selectors. However, the circuit arrangement shown in FIG. 13 requires n/3 full adders, n/6 registers, and n/6 2-input data selectors, and hence is of a reduced circuit scale.

The circuit arrangement shown in FIG. 5 has an overall delay time equivalent to the delay times of one 2-input data selector and one full adder, irrespective of the word length of input data, and therefore can operate at high speed. However, the circuit arrangement shown in FIG. 13 operates at lower speed because it has an overall delay time equivalent to the delay times of one 2-input data selector and two full adders, irrespective of the word length of input data.

An accumulator which basically incorporates the adder circuit illustrated in FIG. 13 will be described below with reference to FIGS. 16 and 17A through 17L.

Figure 13:
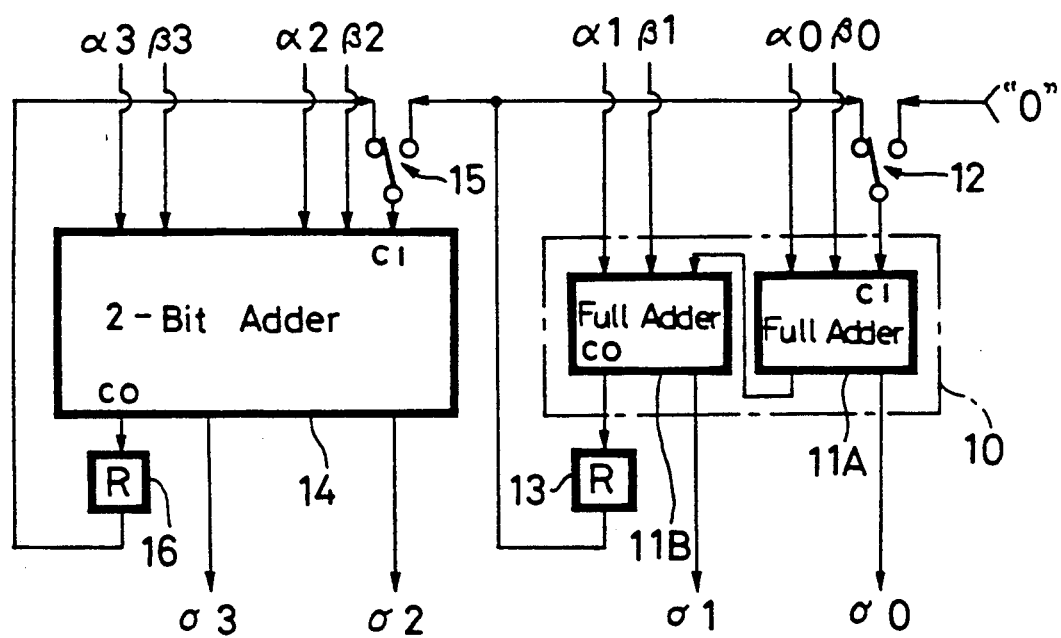
FIG. 13 is a block diagram of an adder circuit according to a second embodiment of the present invention.
Figure 16:
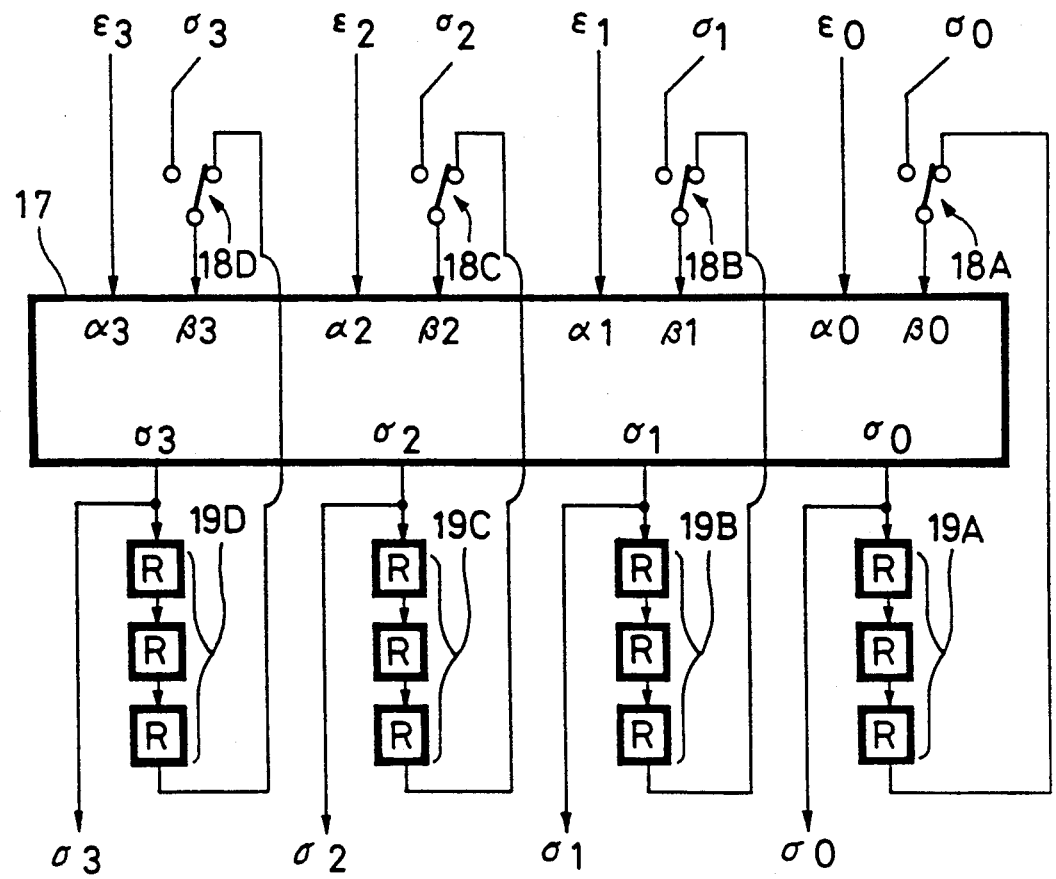
FIG. 16 is a block diagram of an accumulator which basically incorporates the adder circuit shown in FIG. 13.

As shown in FIG. 16, the accumulator includes an adder circuit 17 which is identical to the adder circuit shown in FIG. 13. In FIG. 16, the signal lines $\alpha 0$, $\beta 0$, $\alpha 1$, $\beta 1$, $\alpha 2$, $\beta 2$, $\alpha 3$, $\beta 3$ are referred to as input terminals $\alpha 0$, $\beta 0$, $\alpha 1$, $\beta 1$, $\alpha 2$, $\beta 2$, $\alpha 3$, $\beta 3$ and the signal lines $\sigma 0$, $\sigma 1$, $\sigma 2$, $\sigma 3$ as output terminals $\sigma 0$, $\sigma 1$, $\sigma 2$, $\sigma 3$. The accumulator includes 2-input data selectors 18A through 18D, and delay circuits 19A $\sim$ 19D each composed of three cascaded unit delay elements. Signal lines $\epsilon 0 \sim \epsilon 3$ are connected respectively to the input terminals $\alpha 0 \sim \alpha 3$ of the adder circuit 17, and signal lines $\delta 0 \sim \delta 3$ are connected respectively to input terminals of the data selectors 18A $\sim$ 18D. The data selectors 18A $\sim$ 18D have respective output terminals connected to the input terminals $\beta 0 \sim \beta 3$ of the adder circuit 17. The output terminals $\sigma 0 \sim \sigma 3$ of the adder circuit 17 are connected through the respective delay circuits 19A $\sim$ 19D to the other input terminals of the data selectors 18A $\sim$ 18D, respectively. The output terminals $\sigma 0 \sim \sigma 3$ of the adder circuit 17 serve directly as the output terminals of the accumulator.

Data P each having a word length of 12 bits are supplied to the accumulator over the signal lines $\delta 0 \sim \delta 3$, as shown in FIGS. 17A through 17D. Data A, B, C, D each having a word length of 12 bits are supplied to the accumulator over the signal lines $\epsilon 0 \sim \epsilon 3$, as shown in FIGS. 17E through 17H. The output terminals $\sigma 0 \sim \sigma 3$ of the accumulator output the final result O of the addition, or the sum, which has a word length of 12 bits, as shown in FIGS. 17I through 17L. The sum O is expressed as follows:

$$O = P + A + B + C + D = (O11, O10, \ldots, O1, O0) \quad (6).$$

The operation of the accumulator shown in FIG. 16 is the same as the operation of the accumulator shown in FIG. 11, and will not be described in detail below.

Figure 1:
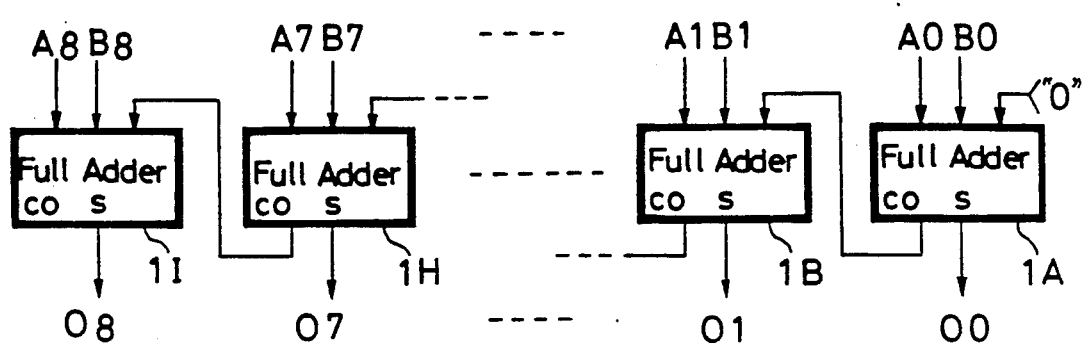
FIG. 1 is a block diagram of a conventional adder circuit.
Figure 2:
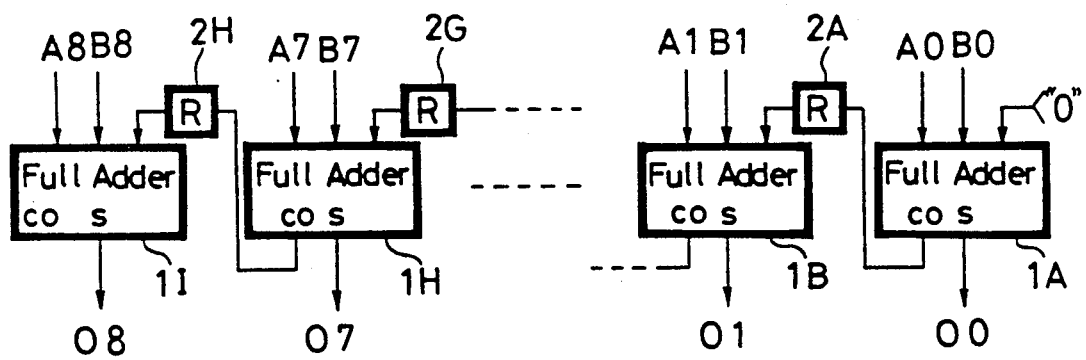
FIG. 2 is a block diagram of a conventional pipelined adder circuit.
Figure 3A:
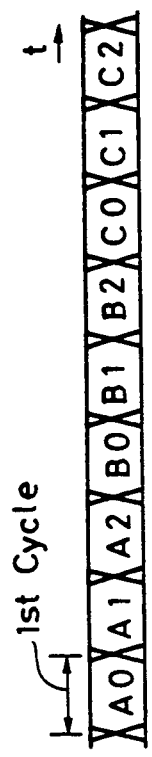
FIGS. 3A, 3B, and 3C are timing charts showing data transmission systems for transmitting data in a time-division multiplexed manner.
Figure 3B:
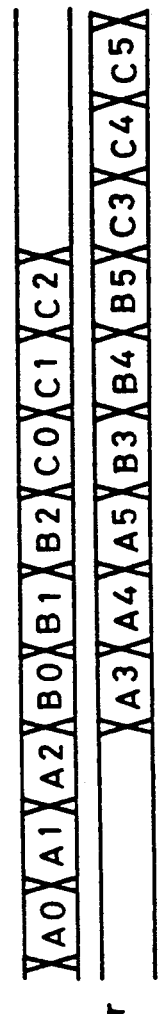
Figure 3C:
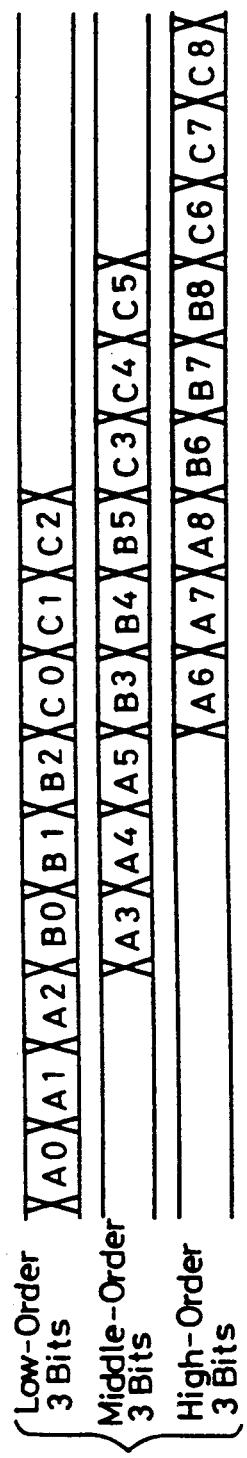

In the first embodiment, input data having a word length of 9 bits, which are inputted according to the format shown in FIGS. 3A through 3C, are added by the circuit arrangement shown in FIG. 5, and the sum is outputted therefrom in the same format as the input data. In the second embodiment, input data having a word length of 12 bits, which are inputted according to the format shown in FIGS. 4A through 4C, are added by the circuit arrangement shown in FIG. 13, and the sum is outputted therefrom in the same format as the input data.

The above embodiments are generalized as follows: When input data having a word length of n bits are transmitted over kn/l signal lines, they can be added by an adder comprising n/l k-bit adders, n/l registers, and n/l 2-input data selectors, and the sum can be outputted from the adder in the same format as the input data. In the arrangement shown in FIGS. 3A through 3C and 5, k=1, n=9, and l=3. In the arrangement shown in FIGS. 4A through 4C and 13, k=2, n=12, and l=6.

Having described preferred embodiments of the invention with reference to the accompanying drawings, it is to be understood that the invention is not limited to that precise embodiments and that various changes and modifications could be effected by one skilled in the art without departing from the spirit or scope of the invention as defined in the appended claims.

What is claimed is:

1. A digital data processing circuit comprising:
   a 2-input data selector having two input terminals and an output terminal;
   a first register connected to one of said two input terminals of the 2-input data selector;
   a first full adder having a carry output terminal connected to said first register, for supplying a carry output through said first register to said one input terminal of said 2-input data selector, said output terminal of said 2-input data selector being connected to an input terminal of said first full adder;
   a second register connected to the other of said two input terminals of said 2-input data selector; and
   a second full adder having a carry output terminal connected to said second register, for supplying a carry output through said second register to the other input terminal of said 2-input data selector, said first and second full adders having input terminals for receiving first and second data supplied in a time-division multiplexed manner;
   wherein said 2-input data selector is controlled to select the supplied carry outputs for producing the sum of the first and second data as sum outputs from said first and second full adders.

* * * * *